United States Patent [19]

Yoshizawa

[11] 4,257,079
[45] Mar. 17, 1981

[54] APPARATUS FOR REWINDING MAGNETIC TAPE IN VIDEO CASSETTE

[75] Inventor: Keiichi Yoshizawa, Tokyo, Japan

[73] Assignee: TDK Electronics Co., Ltd., Tokyo, Japan

[21] Appl. No.: 39,354

[22] Filed: May 16, 1979

[30] Foreign Application Priority Data

Jun. 9, 1978 [JP] Japan ................... 53-78061

[51] Int. Cl.³ .................. B08B 1/02; B08B 5/00; G11B 23/00
[52] U.S. Cl. .................... 360/137; 360/128; 15/100
[58] Field of Search ................ 360/137, 128; 15/306, 15/100

[56] References Cited

U.S. PATENT DOCUMENTS

| 3,872,510 | 3/1975 | Childress, Jr. et al. | 360/137 |
| 4,004,314 | 1/1977 | Post et al. | 360/137 |
| 4,010,514 | 3/1977 | Fisher et al. | 360/137 X |

FOREIGN PATENT DOCUMENTS 46-20190 3/1971 Japan ................... 360/137

Primary Examiner—John H. Wolff
Attorney, Agent, or Firm—Oblon, Fisher, Spivak, McClelland & Maier

[57] ABSTRACT

An apparatus for rewinding a magnetic tape in a video cassette comprises a feeding reel and a winding reel which hold a cleaning tape along a part of the magnetic tape; a pushing pad for pushing the cleaning tape on the magnetic tape; and means for driving the winding reel to feed the cleaning tape at a low speed to the direction reversing to the forward direction of the magnetic tape.

4 Claims, 3 Drawing Figures

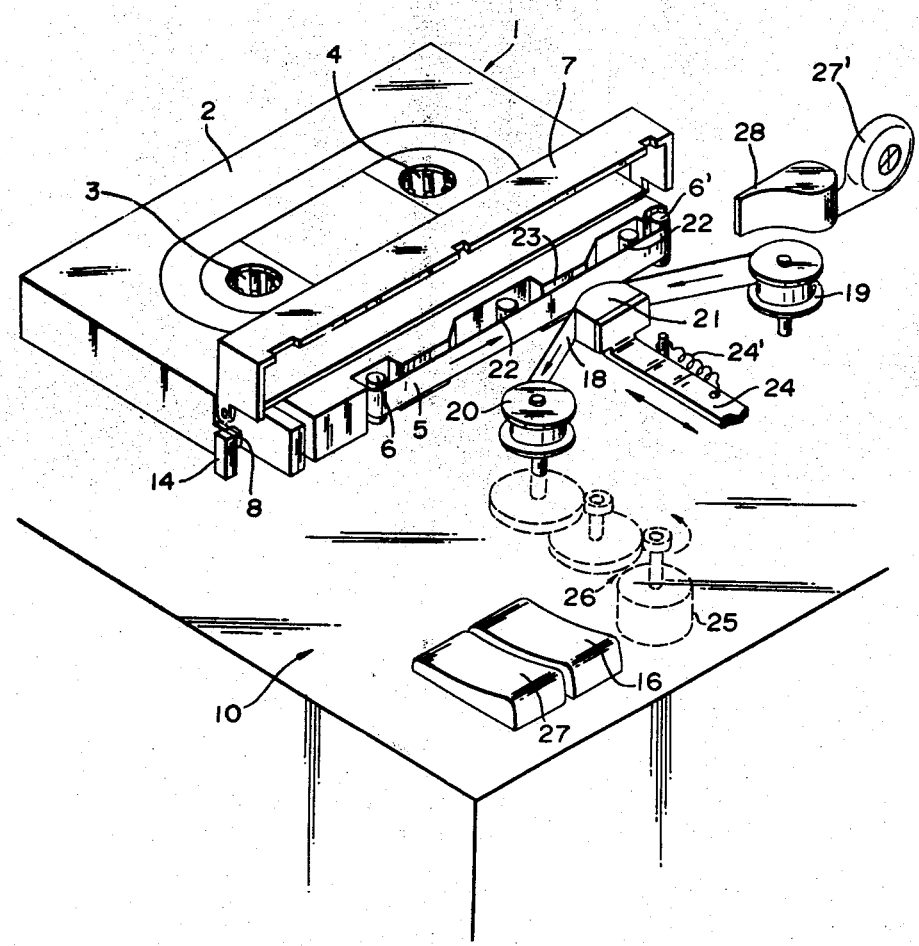

APPARATUS FOR REWINDING MAGNETIC TAPE IN VIDEO CASSETTE

BACKGROUND OF THE INVENTION:

1. Field of the Invention:

The present invention relates to an apparatus for rewinding a magnetic tape in a video cassette. More particularly, it relates to an apparatus for cleaning a magnetic tape in a video cassette.

2. Description of the Prior Art:

A video tape records high frequency signal. The wave length recorded on a magnetic tape is short and accordingly, the adhesion of an impurity such as dust and other material is hated.

Where the impurity is adhered on the surface of the magnetic tape, a contact between the recording head or the reproducing head at a concave recess and the magnetic tape is disturbed whereby the trouble on the reproduced pictures is caused by a drop-out.

In the case of broadcast or industrial applications of the video tapes, a video recorder is usually held in a non-dust room. However, in the case of a household video recorder, a video recorder and a video cassette are usually used under unfavorable conditions whereby the above-mentioned troubles are often caused.

SUMMARY OF THE INVENTION

It is an object of the present invention to provide an apparatus for rewinding a magnetic tape in a video cassette which prevents troubles caused by drop-out on reproduced pictures.

The foregoing and other objects of the present invention have been attained by providing an apparatus for rewinding a magnetic tape in a video cassette which comprises a feeding reel and a winding reel which hold a cleaning tape along a part of the magnetic tape; and means for driving the winding reel to feed the cleaning tape at a low speed to the direction reversing to the forward direction of the magnetic tape.

BRIEF DESCRIPTION OF THE DRAWINGS

FIG. 3 is a schematic view of the apparatus of the present invention.

DETAILED DESCRIPTION OF THE PREFERRED EMBODIMENTS

Figure 1:
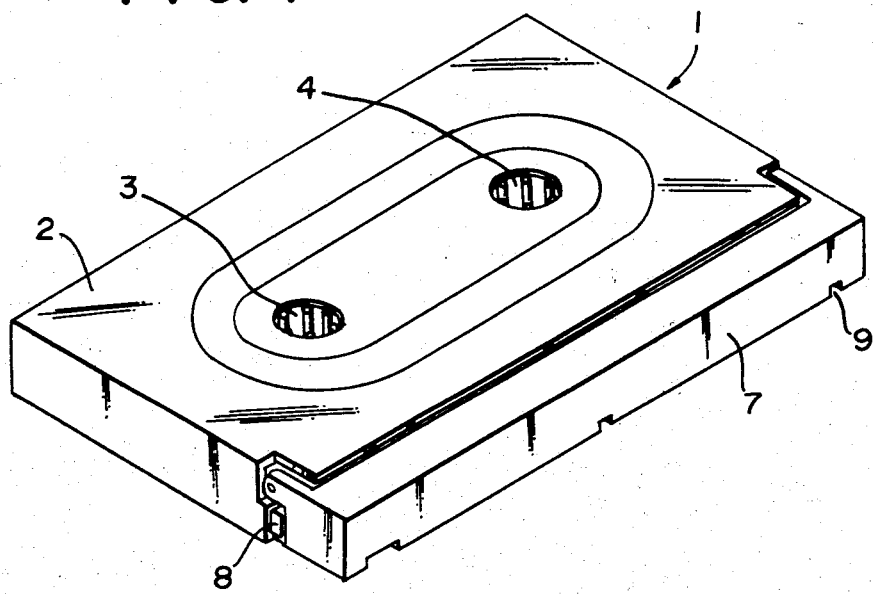
FIg. 1 is a schematic view of a video cassette tape.

In FIG. 1, a video tape cassette (1) comprises a body (2) of a casing which prevents entrance of dust from outside, winding hubs (3), (4) on which a video tape (5) (FIG. 2) is wound. As shown in FIG. 3, the tape is guided by guide pins (6), (6') to expose at the exposing part.

This exposing part is covered by a pivoted cover (7). The pivoted cover (7) is kept in the position shown in FIG. 1 by a spring (not shown) and is automatically locked by a locking mechanism (8). The tape is usually covered by the pivoted cover (7). However, there are gaps from which entrance of dust is caused. When the tape cassette is set on a video recorder, the lock (8) of the pivoted cover (7) is pushed to expose the magnetic tape (5) and to contact the magnetic tape (5) with the magnetic head whereby dust is adhered on the magnetic tape.

When the recording and the reproducing are repeated under such condition, a trouble caused by dust can not be prevented.

The present invention is considered in the view of the fact that the magnetic tape runs to only one direction during recording or reproducing the video cassette tape. The magnetic tape rewound by a special rewinding device after the use and the cleaning tape is contacted with the magnetic tape by a pushing pad whereby cleaning of the magnetic tape is performed during the rewinding step. The above-mentioned trouble can be prevented.

The present invention will be further illustrated by examples referring to the drawings.

Figure 2:
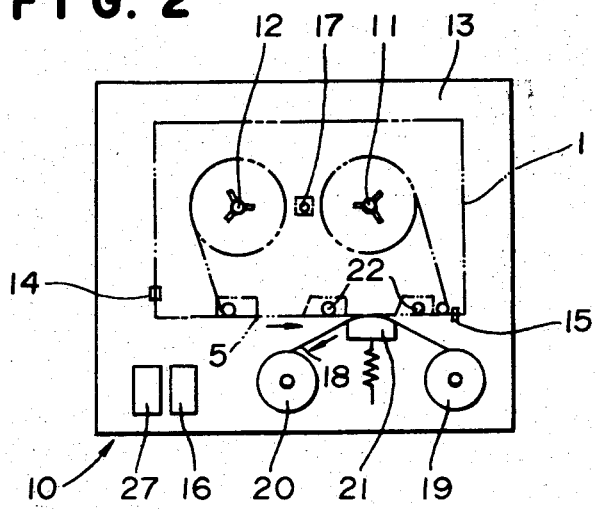
FIG. 2 is a plan view of an apparatus for rewinding a magnetic tape according to the present invention.

FIG. 2 is a plan view of the embodiment of the present invention and FIG. 3 is a schematic view of the embodiment in detail.

In FIG. 2, a winding device (10) can be set by a guide device (not shown) for setting and detaching the video tape cassette (1) at the position shown in FIG. 2. Rotary shafts (11), (12) are projected from the deck (13) of the winding device. The shaft (11) is actuated as a driving shaft by a motor (not shown) equipped on the rear surface of the deck. The central holes of the winding hubs of the video tape cassette (1) are respectively fitted on the shafts (11), (12) to give the driving force. The normal running direction of the magnetic tape (5) is shown by the arrow line. A delocking pin (14) (FIG. 3) which is also used in the conventional video recorder is projected from the deck (13). The taper part of the pin (14) delocks the lock of the pivoted cover (7) when the lock pin (8) is inwardly pushed. A push-up rod (15) for pushing up a concave recess (9) of the cover (7) is fitted. The rod is connected to a set lever (16) to turn the pivoted cover at the upper position shown in FIG. 3. (In FIG. 3, the push-up rod (15) is not shown). A pin (17) is projected from the surface of the deck (13) to delock the lock of the hub for winding the magnetic tape. A cleaning tape (18) is disposed to face the magnetic surface of the magnetic tape (5) and is gradually fed to the arrow direction from a feeding reel (19) to the winding reel (20). The cleaning tape (18) is slightly pushed on the magnetic tape by the push pad (21) which is interlocked with the set lever (16). In order to guide the magnetic tape without failure, a guide pin (22) is projected from the deck at the position of the concave recess of the video cassette.

In FIG. 3, the guide pin (22) holds the magnetic tape (5) from its rear surface. A surface (23) of the video cassette is formed between the pin (22). The cleaning tape (18) is pushed on this part (23) by the pad (21) by utilizing the forward part. The pad (21) is made of a soft material such as a felt and is held by a shifting lever (24). The hook of the shifting lever (24) is released by pushing the set lever (16). The shifting lever (24) is pushed through the cleaning tape (18) and the magnetic tape (5) on the surface (23) by a weak spring (24'). The cleaning tape is made of a non-woven fabric, a woven fabric or the other desired material which easily adsorbs dust. Since the cleaning tape (18) adsorbs an impurity, there is a possibility to transfer the impurity on the surface of the magnetic tape (5). Accordingly, the shaft of the winding reel (20) is rotated from the low speed motor (25) through the speed reduction gear set (26) whereby new surface of the cleaning tape is contacted with the surface of the magnetic tape (5) whereby the cleaning effect can be improved. It is also possible to blow out the impurity adhered on the magnetic tape over the pad part, by facing the nozzle of the blower (27') toward the down-stream to the pad (21).

When the video tape cassette (1) is set in the winding device the lock pin (8) is interlocked with the delocking pin (14) so as to release the movable cover (7). At the same time, the lock of the hub for winding the tape, by the pin (17). When the set lever (16) is pushed on, the push-up rod (15) pushes up the pivoted cover (7) to the position shown in FIG. 3. At the same time, the cleaning tape is contacted with the magnetic tape (5) by the pad (21). Then, a start button (27) is pushed to drive the shafts (11), (12) whereby the magnetic tape is rewound at high speed to the arrow direction. At the same time, the motor (25) (and the blower (27')) is started whereby the cleaning tape (18) is gradually fed to the direction reversing to the forward direction of the magnetic tape (5) to expose a newly formed surface of the magnetic tape (5).

In accordance with the apparatus of the present invention, the cleaning step and the winding step can be simultaneously performed and the trouble caused by the impurity can be prevented, in the view of the structure of the present invention.

What is claimed as new and desired to be secured by Letters Patent of the United States is:

1. In an apparatus for rewinding a magnetic tape in a video cassette, said cassette including at least one exterior flat surface over which said tape passes during rewinding, a tape cleaning device comprising:

a movable pushing pad located opposite said flat surface from said magnetic tape;

a cleaning tape extending between said movable pushing pad and said magnetic tape, said cleaning tape normally in contact with said pushing pad;

a supply reel and a take up reel for said cleaning tape;

means for continuously driving at least one of said reels only when said magnetic tape is rewound, said means adapted to rotate said at least one reel in a direction which moves said cleaning tape opposite the direction of said magnetic tape; and means adapted for moving said pushing pad adjacent said exterior flat surface of said cassette, with said cleaning and magnetic tapes positively held therebetween, to thereby clean said magnetic tape, said means for moving said pushing pad being actuated by the rewinding of said magnetic tape.

2. An apparatus according to claim 1 wherein said magnetic tape is held by guide pins from the rear surface of said magnetic tape near the position of pushing said cleaning tape by said pad.

3. An apparatus according to claim 1 which further comprises a nozzle from which air is blown toward downstream of said magnetic tape travel so as to remove dust from the surface of said magnetic tape.

4. An apparatus according to claim 1 wherein said pad is connected at a top of a shifting lever which is shifted by being unlocked.

* * * * *